(12) United States Patent
Burns

(10) Patent No.: US 7,499,604 B1
(45) Date of Patent: Mar. 3, 2009

(54) OPTICALLY COUPLED RESONANT PRESSURE SENSOR AND PROCESS

(76) Inventor: David W. Burns, 15770 Rica Vista Way, San Jose, CA (US) 95127-2731

( * ) Notice: Subject to any disclaimer, the term of this patent is extended or adjusted under 35 U.S.C. 154(b) by 135 days.

(21) Appl. No.: 11/164,914

(22) Filed: Dec. 10, 2005

Related U.S. Application Data

(60) Provisional application No. 60/593,116, filed on Dec. 12, 2004.

(51) Int. Cl.
   *G02B 6/00* (2006.01)
(52) U.S. Cl. .............................. 385/12; 385/32; 385/30; 385/8; 385/9
(58) Field of Classification Search .................... 385/12
   See application file for complete search history.

(56) References Cited

U.S. PATENT DOCUMENTS

| | | |
|---|---|---|
| 4,126,049 A | 11/1978 | Cotter |
| 4,137,511 A | 1/1979 | Jones |
| 4,372,173 A | 2/1983 | EerNise |
| 4,567,451 A | 1/1986 | Greenwood |
| 4,721,925 A | 1/1988 | Farace |
| 4,724,351 A | 2/1988 | EerNisse |
| 4,743,752 A | 5/1988 | Olsen |
| 4,744,863 A | 5/1988 | Guckel |
| 4,772,786 A | 9/1988 | Langdon |
| 4,831,304 A | 5/1989 | Dorey |
| 4,841,775 A | 6/1989 | Ikeda |
| 4,853,669 A | 8/1989 | Guckel |
| 4,884,450 A * | 12/1989 | Greenwood et al. ........... 73/702 |
| 4,897,360 A | 1/1990 | Guckel |
| 4,926,143 A | 5/1990 | Harada |
| 4,966,649 A | 10/1990 | Harada |
| 4,996,082 A | 2/1991 | Guckel |
| 5,009,108 A | 4/1991 | Harada |
| 5,060,526 A | 10/1991 | Barth |
| 5,089,695 A | 2/1992 | Willson |
| 5,090,254 A | 2/1992 | Guckel |
| 5,101,664 A | 4/1992 | Hockaday |
| 5,105,665 A | 4/1992 | Parsons |
| 5,165,289 A | 11/1992 | Tilmans |
| 5,188,983 A | 2/1993 | Guckel |
| 5,275,055 A | 1/1994 | Zook |
| 5,295,395 A | 3/1994 | Hocker |
| 5,338,929 A | 8/1994 | Douma |
| 5,417,115 A | 5/1995 | Burns |
| 5,442,963 A | 8/1995 | Largeau |
| 5,458,000 A | 10/1995 | Burns |
| 5,473,944 A | 12/1995 | Kurtz |
| 5,485,753 A | 1/1996 | Burns |
| 5,511,427 A | 4/1996 | Burns |
| 5,543,349 A | 8/1996 | Kurtz |

(Continued)

*Primary Examiner*—Frank G Font
*Assistant Examiner*—Eric Wong
(74) *Attorney, Agent, or Firm*—David W. Burns

(57) ABSTRACT

A process for fabricating an optically coupled resonant pressure sensor includes the steps of forming a sensor die including at least one optically coupled resonator from a first semiconductor substrate and forming a cap die including a fiber hole from a second semiconductor substrate. The sensor die and the cap die are aligned and bonded to form a resonant pressure sensor capsule. The fiber hole in the cap die is aligned with at least one resonator on the sensor die. Also disclosed is an optically coupled resonant pressure sensor formed from steps thereof.

25 Claims, 9 Drawing Sheets

U.S. PATENT DOCUMENTS

| | | |
|---|---|---|
| 5,550,516 A | 8/1996 | Burns |
| 5,559,358 A | 9/1996 | Burns |
| 5,654,819 A | 8/1997 | Goossen |
| 5,683,594 A | 11/1997 | Hocker |
| 5,714,690 A | 2/1998 | Burns |
| 5,729,075 A | 3/1998 | Strain |
| 5,747,705 A | 5/1998 | Herb |
| 5,772,322 A | 6/1998 | Burns |
| 5,780,742 A | 7/1998 | Burns |
| 5,808,210 A * | 9/1998 | Herb et al. ............... 73/862.59 |
| 5,831,262 A | 11/1998 | Greywall |
| 5,844,236 A | 12/1998 | Wilson |
| 5,880,509 A | 3/1999 | Watanabe |
| 5,969,257 A | 10/1999 | De Bortoli |
| 6,006,607 A | 12/1999 | Bryzek |
| 6,031,944 A | 2/2000 | Youngner |
| 6,229,190 B1 | 5/2001 | Bryzek |
| 6,246,638 B1 | 6/2001 | Zook |
| 6,255,728 B1 | 7/2001 | Nasiri |
| 6,346,742 B1 | 2/2002 | Bryzek |
| 6,351,996 B1 | 3/2002 | Nasiri |
| 6,487,913 B2 | 12/2002 | Debesis |
| 6,557,419 B1 | 5/2003 | Herb |
| 6,710,355 B2 | 3/2004 | Youngner |
| 6,714,007 B2 * | 3/2004 | Youngner ................ 324/244.1 |
| 6,763,723 B1 | 7/2004 | Zook |
| 6,894,787 B2 | 5/2005 | Youngner |
| 6,966,228 B2 * | 11/2005 | Binet et al. .................... 73/754 |
| 7,000,477 B2 * | 2/2006 | Youngner et al. ............. 73/702 |
| 2002/0157473 A1 * | 10/2002 | Stemme et al. ............... 73/704 |
| 2004/0231409 A1 | 11/2004 | Lelong-Feneyrou |
| 2004/0244502 A1 | 12/2004 | Youngner |

* cited by examiner

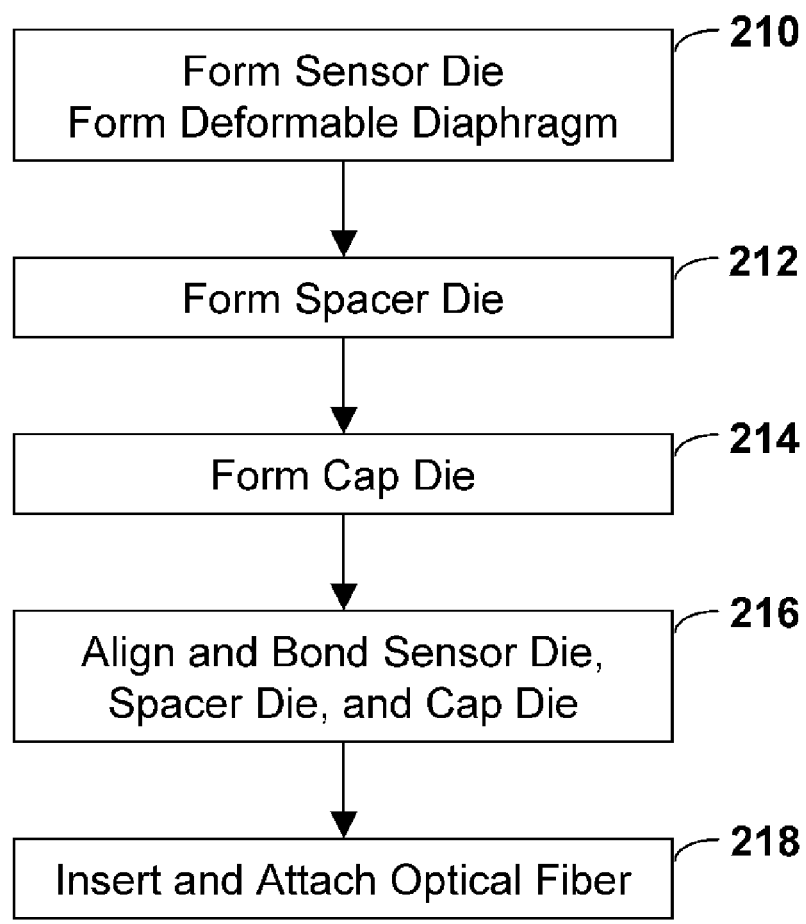

OPTICALLY COUPLED RESONANT PRESSURE SENSOR AND PROCESS

CROSS-REFERENCES TO RELATED APPLICATIONS

This application claims the benefit of, and hereby incorporates by reference in its entirety U.S. Provisional Application No. 60/593,116 filed Dec. 12, 2004, and also incorporates by reference in its entirety co-pending U.S. Utility application Ser. No. 10/905,036 filed Dec. 12, 2004, U.S. Provisional Application No. 60/593,117 filed Dec. 12, 2004, U.S. Provisional Application No. 60/593,118 filed Dec. 12, 2004, and U.S. Provisional Application No. 60/593,119 filed Dec. 12, 2004.

FIELD OF THE INVENTION

This invention relates generally to pressure sensors, and more specifically to optically coupled resonant pressure sensors.

BACKGROUND OF THE INVENTION

Resonant sensors are used in the precision pressure measurement field because of their high stability, high sensitivity and low temperature coefficients. Resonant sensors can be constructed of primarily silicon-based materials using standard processes of the semiconductor industry including thin-film deposition, etching, doping and lithography. While resonant pressure sensors are generally more complex than piezoresistive pressure sensors, their stability and accuracy are less dependent on electronic signal processing circuitry than are comparable piezoresistive sensors and capacitive sensors. Currently available resonant sensors have resonators comprised of a single material such as quartz, single crystal silicon or deposited polysilicon films. Very high precision resonators have been made from well-cut quartz.

The vibrating micromechanical body or resonator of a resonant pressure sensor provides a frequency as output data, the frequency depending upon a stress such as pressure that modifies the natural resonant vibrational frequency of the resonator. A load applied to the sensor structure strains the resonator causing a resonant frequency shift of the resonator. The frequency output of the resonator provides a measure of the magnitude of the mechanical load applied to the sensor structure, and as a result, pressure can be measured as a consequence of the frequency shift. Currently available resonant pressure sensors interface with analog and/or digital electronics to measure pressure.

In a conventional piezoresistive pressure sensor, deformations of a silicon diaphragm with applied pressure cause shifts in a Wheatstone bridge fabricated from single-crystal piezoresistors in the diaphragm resulting in a voltage output indicating the amount of pressure applied to the sensor. The output voltage from the Wheatstone bridge requires an analog-to-digital (A/D) conversion to be used in digital systems. An example of a surface-micromachined absolute pressure sensor has a pressure diaphragm formed from a deposited thin film of polysilicon with an integral vacuum cavity reference directly under the diaphragm and dielectrically isolated polysilicon piezoresistors, as described in "Sealed cavity semiconductor pressure transducers and method of producing the same," U.S. Pat. No. 4,744,863, Guckel et al., issued May 17, 1988.

The widespread use and continuing trend toward digital information and control systems, together with the need for more accurate and higher-pressure instrumentation, have prompted the development of digital pressure transducers capable of precision measurements in pressure ranges up to about 250 MPa. One exemplary high-precision digital pressure sensor operates on the principle of changing the resonant frequency of load-sensitive quartz crystals with pressure-induced stress. Frequency signals from the quartz crystals are counted and linearized through microprocessor-based electronics to provide two-way communication and control in digital formats. The aforementioned quartz crystal pressure transducers have a resolution as good as a few parts per billion and have been used to determine the performance of high precision, primary standard dead-weight testers.

One example of a surface-micromachined resonant sensor has a resonant strain gage formed from a deposited thin film of polysilicon with an integral vacuum cavity surrounding the resonator. Several patents providing background to such resonant sensors include "Dielectrically isolated resonant microsensors," U.S. Pat. No. 5,417,115, Burns, issued May 23, 1995; "Static pressure compensation of resonant integrated microbeam sensors," U.S. Pat. No. 5,458,000, Burns et al., issued Oct. 17, 1995; "Cantilevered microbeam temperature sensor;" U.S. Pat. No. 5,511,427, Burns, issued Apr. 30, 1996; "Method for making a thin film resonant microbeam absolute;" U.S. Pat. No. 5,747,705 Herb et al., issued May 5, 1998; and "Thin film resonant microbeam absolute pressure sensor," U.S. Pat. No. 5,808,210 Herb et al., issued Sep. 15, 1998.

Another example of a resonant pressure sensor, which is fabricated from single-crystal silicon, is disclosed in "Semiconductor pressure sensor and its manufacturing method," Watanabe et al., U.S. Pat. No. 5,880,509 issued Mar. 9, 1999. The sensor comprises a single-crystal silicon substrate, a closed air-gap chamber, a measured diaphragm made by epitaxial growth, and a strain detection element incorporated in the measuring diaphragm.

The operation of a resonant pressure sensor requires a resonator to be excited into vibrational motion and detection of this motion. Forces and moments are applied that bend, twist, elongate or contract the resonator. Various methods for excitation and detection of resonant sensors have been proposed including thermal excitation with piezoresistive detection; electrostatic excitation with capacitive detection; Lorentz force excitation with magnetic flux detection; piezoelectric excitation with piezoelectric detection, and optical excitation with optical detection. In an exemplary method, resonant microbeams are driven and sensed by a single multimode optical fiber using a strain-sensitive oscillator, as described in "Fiber-optic vibration sensor based on frequency modulation of light-excited oscillators," U.S. Pat. No. 6,246,638, Zook et al., issued Jun. 12, 2001. A suggested method for driving and sensing a resonant sensor by using modulated and unmodulated light from multiple light sources is described in "Multi-wavelength optical drive/sense readout for resonant microstructures," U.S. Pat. No. 5,844,236, Wilson, issued Dec. 1, 1998. A photodetector detects the filtered reflected light to determine the resonant frequency of the resonator.

Resonators may be hermetically sealed in an evacuated cavity or enclosure to provide separation from the surrounding environment, eliminating effects such as air damping of the resonator and mass loading on the resonator body.

Micro-electrical-mechanical systems (MEMS) researchers are working on producing precision resonant pressure sensors having increased noise immunity, intrinsic safety, and long line-driving capability. It is desirable that a pressure sensor can operate in the harsh conditions associated with, for example, turbine engines, high-speed combustors, and other aerospace and industrial applications.

Because of limitations in the use of electrically powered/electrical output sensors in high-noise environments, hazardous areas, and some medical applications, it is advantageous to combine the precision of resonator-based sensors with the total optical isolation of fiber-optic technology. One method of optically powering a resonant low-pressure sensor is described in "Optically powered resonant integrated microstructure pressure sensor," Youngner, U.S. Pat. No. 6,710,355, issued Mar. 23, 2004.

In the pressure-sensor industry and other sensor application areas, the need exists for precise and stable sensors having low hysteresis, remote access, electromagnetic interference (EMI) immunity, and increased safety in harsh, volatile, or explosive environments with the elimination of voltage and electronic circuitry at the sensor element. Additional features that are desirable for resonant sensors include a simplified fabrication process, integral vacuum sealing, reduction or elimination of stiction and snap-down or pull-in problems associated with the resonator, accurate positioning of the drive and sense electrodes, alignment of the phase between the drive frequency and resonator movement over a wide frequency range, high signal-to-noise ratio of the detected signal, simplification of the optical interface to the resonator, and the opportunity for relatively easy integration of the sensor with more complex fabrication processes such as complementary metal-oxide-semiconductor (CMOS) and bipolar complementary metal-oxide-semiconductor (BiCMOS) processes.

SUMMARY OF THE INVENTION

One aspect of the invention is a process for fabricating an optically coupled resonant pressure sensor. A sensor die including at least one optically coupled resonator is formed from a first semiconductor substrate. A cap die including a fiber hole is formed from a second semiconductor substrate. The sensor die and the cap die are aligned and bonded to form a resonant pressure sensor capsule. The fiber hole in the cap die is aligned with one or more resonators on the sensor die.

Another aspect of the invention is an optically coupled resonant pressure sensor. A sensor die including at least one optically coupled resonator is formed from a first semiconductor substrate. A cap die including a fiber hole is formed from a second semiconductor substrate. The sensor die and the cap die are aligned and bonded to form a resonant pressure sensor capsule. The fiber hole in the cap die is aligned with at least one resonator on the sensor die.

Another aspect of the invention is an optically coupled resonant pressure sensor comprising a sensor die including a pressure-sensitive deformable diaphragm and at least one optically coupled resonator, and a cap die including a fiber hole. The sensor die and cap die are bonded to form a resonant pressure sensor capsule, wherein the fiber hole in the cap die is aligned with at least one resonator on the sensor die.

Other aspects, features and attendant advantages of the present invention will become more apparent and readily appreciated by the detailed description given below in conjunction with the accompanying drawings. The drawings should not be taken to limit the invention to the specific embodiments, but are for explanation and understanding and are not necessarily drawn to scale. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein:

FIG. 9 is a flow diagram of a process for fabricating an optically coupled resonant pressure sensor, in accordance with another embodiment of the current invention.

DETAILED DESCRIPTION OF THE INVENTION

Figure 1:
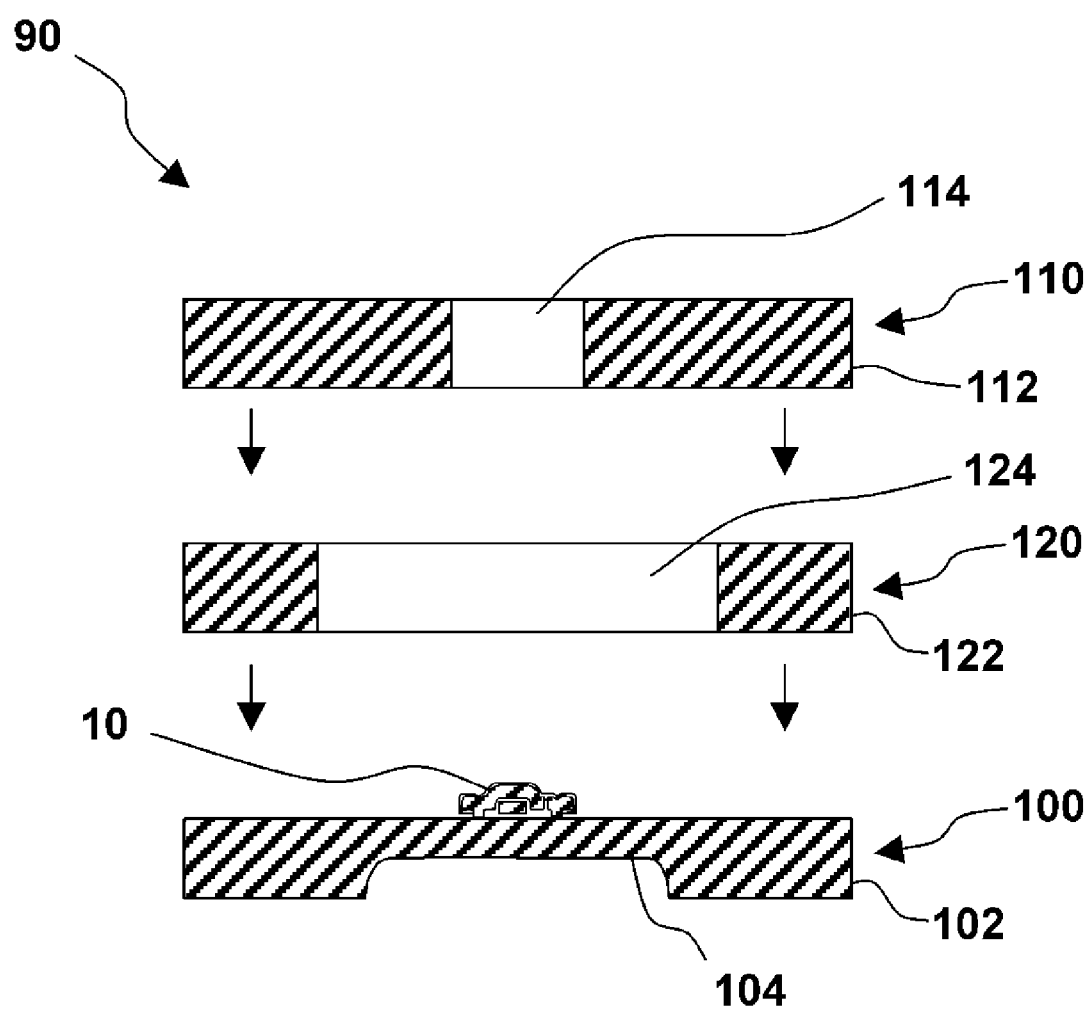
FIG. 1 is a cross-sectional view of portions of an optically coupled resonant pressure sensor, in accordance with one embodiment of the current invention.

FIG. 1 is a cross-sectional view of portions of an optically coupled resonant pressure sensor, in accordance with one embodiment of the present invention. Optically coupled resonant pressure sensor 90 includes sensor die 100 with one or more optically coupled resonators 10 and cap die 110 including fiber hole 114. Sensor die 100 and cap die 110 are aligned and bonded to form resonant pressure sensor capsule 92 with fiber hole 114 in cap die 110 aligned with one or more resonators 10 on sensor die 100, as seen with respect to FIG. 2. For the description of this figure and the figures that follow, similarly numbered objects correspond to similar elements. Spacer die 120 is positioned between sensor die 100 and cap die 110.

Sensor die 100 is formed from semiconductor substrate 102 such as a single-crystal silicon wafer, a silicon-on-insulator (SOI) wafer, or a double-SOI wafer. Use of double-SOI wafers allows a predetermined diaphragm thickness with the lower oxide layer as an etch stop for backside etching, while the upper oxide layer aids in the formation of certain types of open air and sealed-cavity resonators. Sensor die 100 may be formed using a cutting operation such as electric-discharge machining, ultrasonic drilling, core drilling, diamond drilling, ultrasonic milling, laser cutting, water jet cutting, dicing, sawing, machining, drilling, etching or cleaving. An etching process includes, for example, a plasma etching process such as deep reactive ion etching that forms nearly vertical sidewalls in a silicon wafer. Grinding and polishing operations may be used to thin semiconductor substrate 102 to a desired thickness.

Deformable diaphragm 104 may be formed in sensor die 100 by locally thinning semiconductor substrate 102 using, for example, a liquid isotropic or anisotropic etch, a vertical-wall etch such as deep reactive ion etching, or another cutting or forming method. Dimensions of deformable diaphragm 104 are selected based on the desired operating range. For example, pressure sensors for lower pressure ranges may use a thinner diaphragm with a larger diameter, whereas pressure sensors for higher ranges may use a thicker diaphragm with a smaller diameter or no diaphragm at all. Dimensions of resonator 10 may be selected to effectively convert changes in applied strain that result from deflections or deformations of deformable diaphragm 104 as pressure is applied to one side or the other. Mechanical strain applied to ends of resonator 10 causes shifts of one or more resonant frequencies of resonator 10. Additional resonators may be included on sensor die 100 to increase the output signal and to provide additional accuracy by compensating for environmental effects such as temperature.

Cap die 110 is formed from semiconductor substrate 112 such as an n-type or p-type single-crystal silicon wafer, a silicon-on-insulator wafer, a polycrystalline silicon wafer, or other suitable material. Cap die 110 may be formed using a cutting operation such as electric-discharge machining, ultrasonic drilling, core drilling, diamond drilling, ultrasonic milling, laser cutting, water jet cutting, dicing, sawing, machining, drilling, etching or cleaving.

Spacer die 120 including spacer hole 124 may be formed, for example, from semiconductor substrate 122 such as an n-type or p-type single-crystal silicon, a polysilicon wafer, or other suitable material. Spacer die 120 may be formed, for example, using a cutting operation such as electric-discharge machining, ultrasonic drilling, core drilling, diamond drilling, ultrasonic milling, laser cutting, water jet cutting, dicing, sawing, machining, drilling, etching, or cleaving. Spacer die 120 is positioned between sensor die 100 and cap die 110. Spacer die 120 is positioned, for example, between sensor die 100 and cap die 110 at a wafer level or a die level prior to aligning and bonding sensor die 100, spacer die 120, and cap die 110.

Sensor die 100, cap die 110, and spacer die 120 may be aligned and bonded at a wafer level. Alternatively, sensor die 100, cap die 110, and spacer die 120 may be aligned and bonded at a die level. Sensor die 100, cap die 110, and spacer die 120 may be bonded using a bonding technique such as silicon-to-silicon bonding, eutectic bonding, thermocompression bonding, solder bonding, polymeric bonding, thin-film anodic bonding, glass frit bonding, or wafer-to-wafer bonding. Substrates 102, 112 and 122, although presently preferred to be of the same material such as single-crystal silicon or polysilicon, may comprise other materials such as silicon carbide, diamond, silicon-on-sapphire, quartz, Pyrex®, glass, metal, ceramic, plastic, an insulative material, a semiconductor material, a conductive material, or a combination thereof. Selection of materials such as diamond for the substrate and resonator allows high temperature operation.

Sensor die 100 may include one or more optically coupled resonators 10 such as cantilevered resonators, doubly supported resonators, cross resonators, butterfly resonators, crisscross resonators, single-ended and double-ended tuning fork resonators, single-ended and double-ended trident resonators, lobed resonators, circular resonators, oval resonators, ring resonators, beam resonators, balanced resonators, thin-beam resonators, cantilevered resonators with enlarged ends, tandem resonators, tandem resonators with enlarged ends, high-Q resonators, disk resonators, comb resonators, flexural resonators, torsional resonators, combination flexural/torsional resonators, lateral resonators, substrate resonators, bulk-mode resonators, surface-mode resonators, higher-mode resonators, resonators with one or more centered or offset holes, open-air resonators without a lid or shell, multiple resonators, resonator arrays, or combinations thereof may be incorporated.

Figure 2:
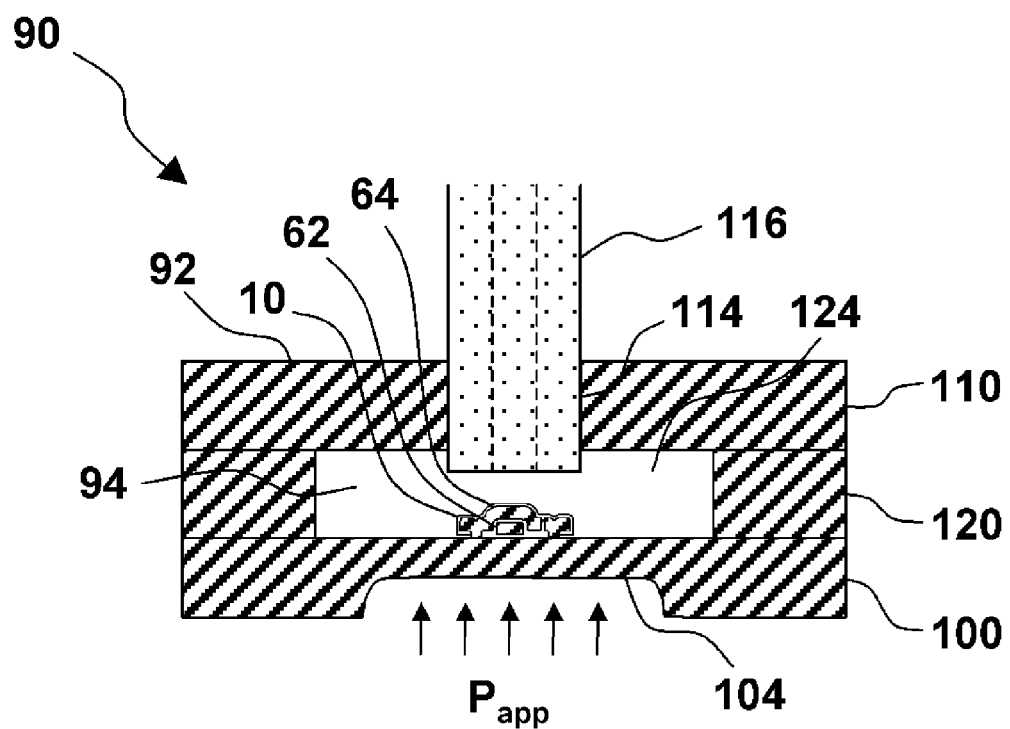
FIG. 2 is a cross-sectional view of an optically coupled resonant pressure sensor, in accordance with one embodiment of the current invention.

FIG. 2 is a cross-sectional view of an optically coupled resonant pressure sensor, in accordance with one embodiment of the present invention. Optically coupled resonant pressure sensor 90 includes sensor die 100 having on or more optically coupled resonators 10 and cap die 110 including fiber hole 114. Sensor die 100 may include deformable diaphragm 104 etched or otherwise formed in sensor die 100. Spacer die 120 including spacer hole 124 is positioned between sensor die 100 and cap die 110. Sensor die 100, cap die 110, and spacer die 120 are aligned and bonded to form resonant pressure sensor capsule 92. Pressure sensor capsule 92 may have, for example, a circular, square or rectangular geometry. Deformable diaphragm 104 may have, for example, a circular, square or rectangular geometry.

Fiber hole 114 in cap die 110 is aligned with at least one resonator 10 on sensor die 100. Additional resonators may be included on sensor die 100 to increase the output signal and to provide additional accuracy by allowing for compensation of effects such as temperature. The additional resonators may be optically coupled to optical fiber 116. Alternatively, the additional resonators may be mechanically coupled to resonator 10, whereby resonator 10 is probed to determine one or more resonant frequencies of resonator 10 and other resonators that are included on sensor die 100. In one example, a plastic or glass optical fiber 116 encompasses resonator 10 and other resonators on sensor die 100, allowing excitation and detection of each resonator. In another example, single-mode or multi-mode optical fiber 116 allows optical coupling to resonator 10 while other resonators included on sensor die 100 are detectable with optical fiber 116 via vibrations transmitted from other resonators through deformable diaphragm 104 to resonator 10. Lenses and other optical elements (not shown) may be used to guide and focus incident light from optical fiber 116 onto resonator 10, and to guide and direct reflected light from a surface of resonator 10.

Optical fiber 116, such as a single-mode fiber, a multi-mode fiber or a plastic fiber may be inserted into fiber hole 114 of cap die 110 and attached to cap die 110. For example, optical fiber 116 is inserted into fiber hole 114 and attached to cap die 110 prior to aligning and bonding sensor die 100 and cap die 110, thereby allowing active alignment where resonance of resonator 10 is excited with incident light from optical fiber 116 and detected to verify the alignment prior to bonding cap die 110 to sensor die 100 and spacer die 120. Cap die 110 is then attached to spacer die 120 and sensor die 100. In another example, optical fiber 116 is inserted into fiber hole 114 and attached to cap die 110 after aligning and bonding sensor die 100, cap die 110, and spacer die 120.

Pressure reference cavity 94 results when sensor die 100, cap die 110, and spacer die 120 are aligned and bonded. Interfaces between sensor die 100, cap die 110, spacer die 120, and optical fiber 116 may be sealed to retain a vacuum or a prescribed pressure within pressure reference cavity 94 that allows absolute pressure measurements with resonant pressure sensor 90. Resonator shell 64 may provide a vacuum seal for resonator 10 in vacuum resonator cavity 62 between resonator shell 64 and sensor die 100, which allows resonator 10 to operate in a local vacuum environment even when pressure reference cavity 94 has a non-vacuum ambient. Resonator shell 64 around resonator 10 may be unnecessary when pressure reference cavity 94 is sealed with a vacuum.

In one manner of operation, light striking a photodiode, which may be located in the substrate underneath or offset laterally from resonator 10, generates an electric field that excites the resonator into resonance. Vibrations of the resonator are detected with reflected light from a surface of resonator 10. Changes in applied pressure elongates or compresses resonator 10 to cause a shift in one or more resonant frequencies of resonator 10 that are detected to provide a measure of the applied pressure. Alternatively, the photodiode for exciting the resonator may be positioned in a portion of the upper surface of the resonator, in a sidewall of the resonator, in a sidewall of the structural layer adjacent to the resonator body, or in the shell, and the resonator may be driven with all or a component of the generated electric field when incident light strikes the photodiode.

Pressure sensors 90 operable in a differential pressure configuration or a gage pressure configuration may be obtained, for example, with a pressure port (not shown) through the side or top of resonant pressure sensor capsule 92 into pressure reference cavity 94, which allows pressure from different sources to be applied across deformable diaphragm 104 that results in output signals corresponding to the pressure differential across deformable diaphragm 104.

Figure 3:
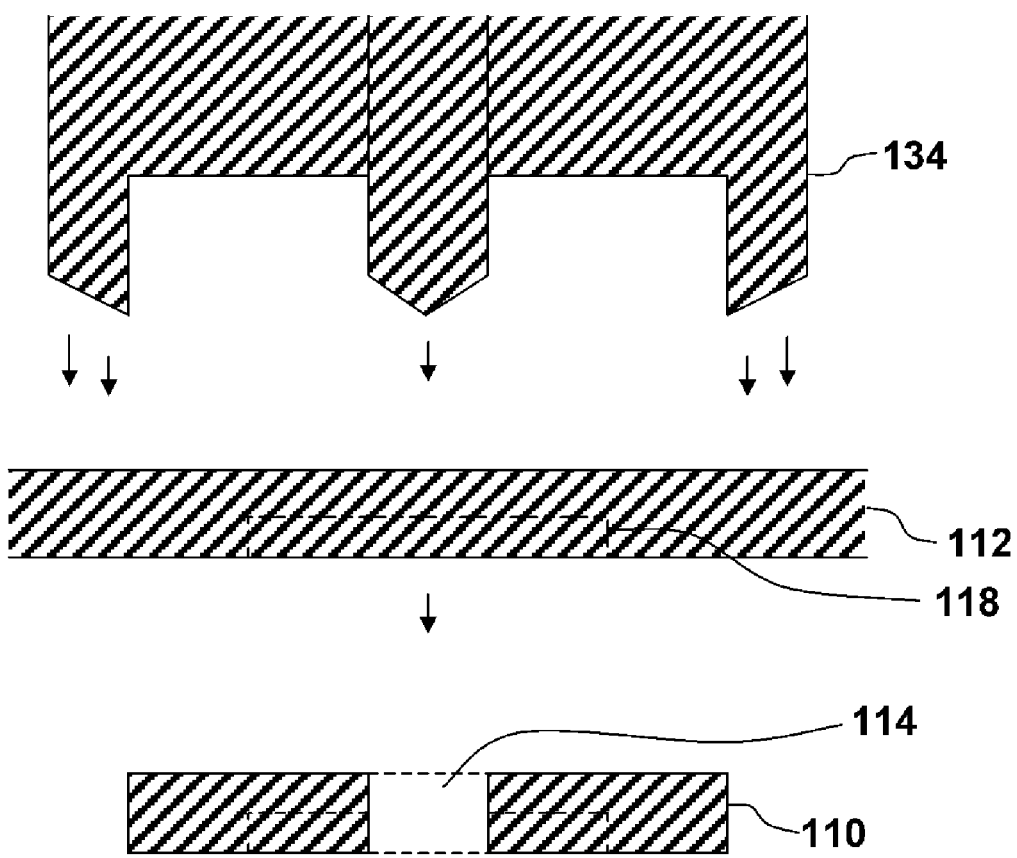
FIG. 3 is a cross-sectional view illustrating a formation process for a cap die of an optically coupled resonant pressure sensor, in accordance with one embodiment of the current invention.

FIG. 3 is a cross-sectional view illustrating a formation process for a cap die of an optically coupled resonant pressure sensor, in accordance with one embodiment of the present invention. Cap-die forming tool 134 cuts a portion of semiconductor substrate 112 such as a single-crystal silicon wafer or a silicon-on-insulator wafer to form cap die 110 with fiber hole 114. Cap die 110 may be formed using a cutting operation such as electric-discharge machining, ultrasonic drilling, core drilling, diamond drilling, ultrasonic milling, laser cutting, water jet cutting, dicing, sawing, machining, drilling, etching or cleaving. Cap die 110 may include cap recess 118 formed in semiconductor substrate 112 at the same time, prior to, or subsequent to the formation of fiber hole 114 and delineation of cap die 110. Fiber hole 114 is sized to allow insertion of optical fiber into fiber hole 114 and attachment thereto.

Figure 4:
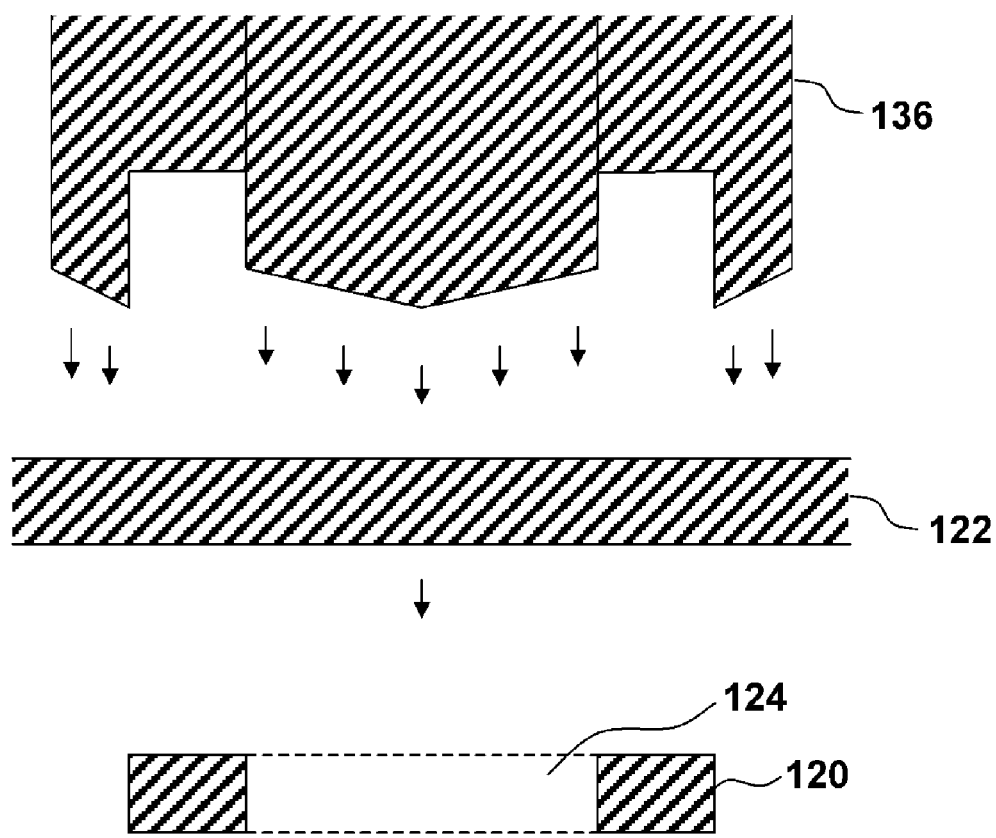
FIG. 4 is a cross-sectional view illustrating a formation process for a spacer die of an optically coupled resonant pressure sensor, in accordance with one embodiment of the current invention.

FIG. 4 is a cross-sectional view illustrating a formation process for a spacer die of an optically coupled resonant pressure sensor, in accordance with one embodiment of the present invention. Spacer-die forming tool 136 with selected cutting dimensions excises a portion of semiconductor substrate 122 such as a single-crystal silicon wafer to form spacer die 120 with spacer hole 124. Spacer die 120 may be formed using a cutting operation such as electric-discharge machining, ultrasonic drilling, core drilling, diamond drilling, ultrasonic milling, laser cutting, water jet cutting, dicing, sawing, machining, drilling, etching or cleaving. Spacer die 120 and spacer hole 124 are sized to allow insertion of optical fiber and to allow displacements of deformable diaphragm 104 during operation.

Figure 5:
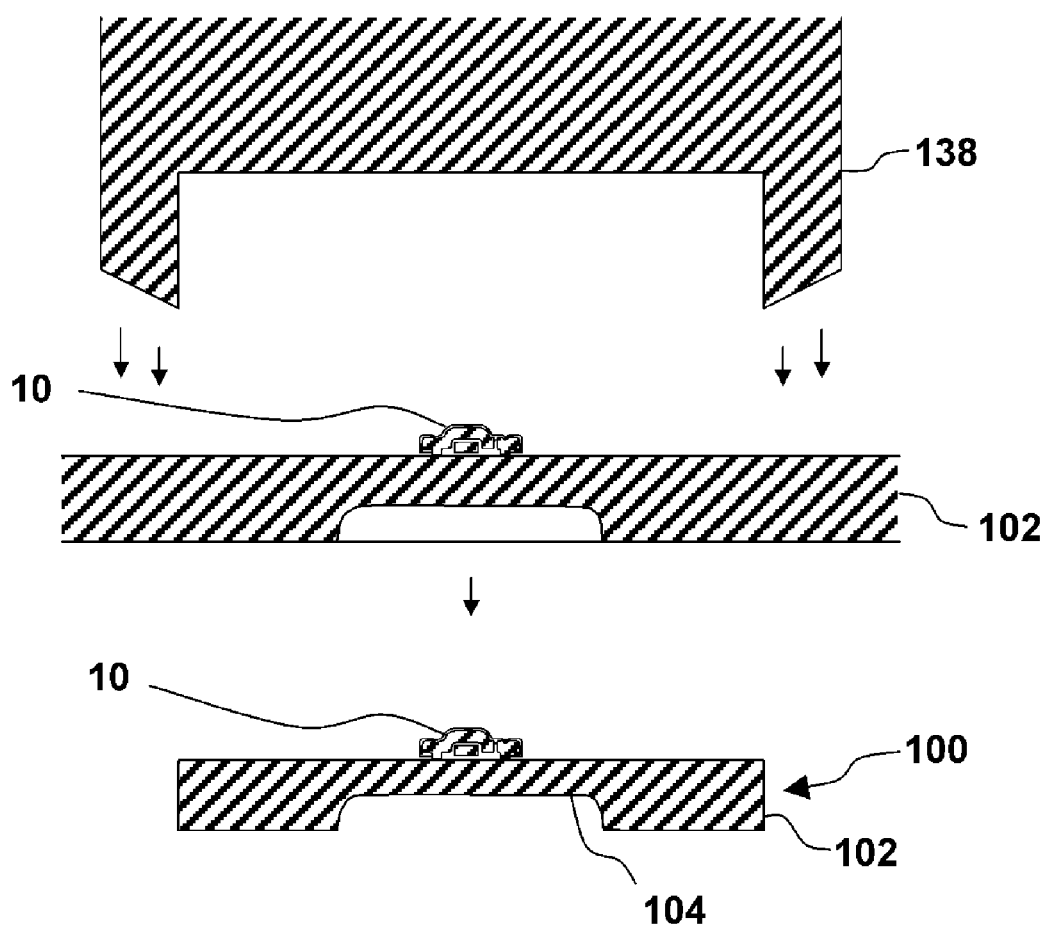
FIG. 5 is a cross-sectional view illustrating a formation process for a sensor die of an optically coupled resonant pressure sensor, in accordance with one embodiment of the current invention.

FIG. 5 is a cross-sectional view illustrating a formation process for a sensor die of an optically coupled resonant pressure sensor, in accordance with one embodiment of the present invention. Sensor-die forming tool 138 with selected cutting dimensions cuts a portion of semiconductor substrate 102 such as a single-crystal silicon wafer or a silicon-on-insulator wafer to form sensor die 100. Sensor die 100 is formed, for example, using a cutting operation such as electric-discharge machining, ultrasonic drilling, core drilling, diamond drilling, ultrasonic milling, laser cutting, water jet cutting, dicing, sawing, machining, drilling, etching or cleaving. Sensor die 100 is sized to operate over a desired pressure range and with suitable burst pressure capability.

Sensor die 100 includes one or more optically coupled resonators 10 that are formed on semiconductor substrate 102 prior to excising. Deformable diaphragm 104 may be formed in sensor die 100 prior to, after, or as part of the formation process for sensor die 100.

Figure 6:
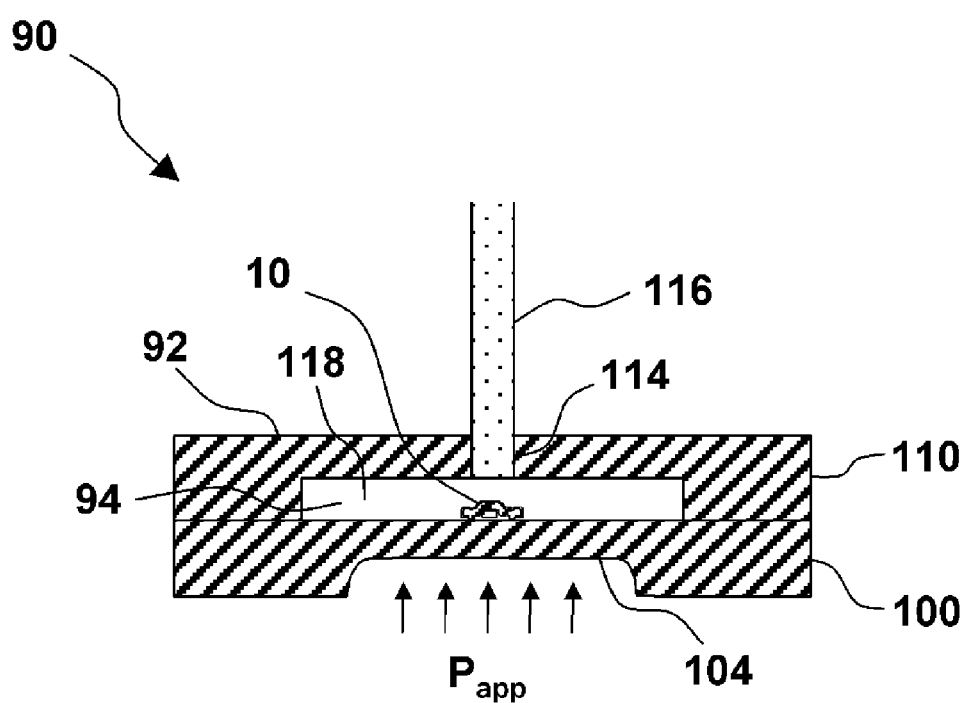
FIG. 6 is a cross-sectional view of an optically coupled resonant pressure sensor, in accordance with another embodiment of the current invention.

FIG. 6 is a cross-sectional view of an optically coupled resonant pressure sensor, in accordance with another embodiment of the present invention. Optically coupled resonant pressure sensor 90 includes sensor die 100 having at least one optically coupled resonator 10 on deformable diaphragm 104 and cap die 110 including fiber hole 114 and cap recess 118. Dimensions of deformable diaphragm 104 are selected based on the desired pressure operating range and overpressure requirements. Sensor die 100 and cap die 110 are aligned and bonded to form resonant pressure sensor capsule 92. Fiber hole 114 in cap die 110 is aligned with at least one resonator 10 on sensor die 100. Optical fiber 116 may be inserted through fiber hole 114 of cap die 110 and attached to cap die 110 prior to or subsequent to the aligning and bonding of cap die 110 to sensor die 100. In one example, cap recess 118 of cap die 110 serves as pressure reference cavity 94 when sensor die 100 and cap die 110 are aligned and bonded for absolute pressure sensor configurations. In another example, a pressure port (not shown) through a side or the top of cap die 110 allows for differential or gage pressure sensor configurations.

Figure 7:
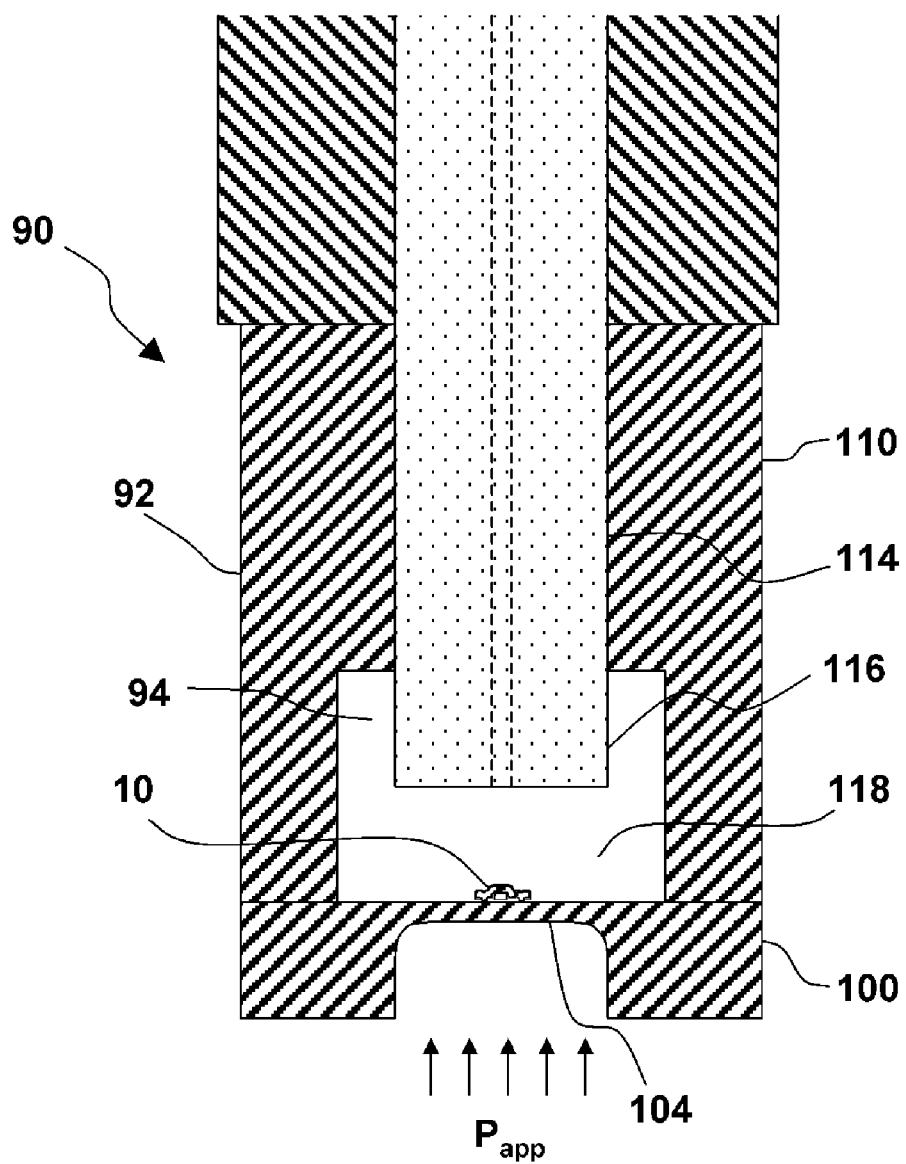
FIG. 7 is a cross-sectional view of an optically coupled resonant pressure sensor with an extended cap die, in accordance with another embodiment of the current invention.

FIG. 7 is a cross-sectional view of an optically coupled resonant pressure sensor with an extended cap die for additional stress isolation, in accordance with another embodiment of the present invention. Optically coupled resonant pressure sensor 90 includes a nominally circular sensor die 100 having at least one optically coupled resonator 10 on deformable diaphragm 104 and cap die 110 including fiber hole 114 and cap recess 118. Sensor die 100 and cap die 110 are aligned and bonded to form resonant pressure sensor capsule 92. Fiber hole 114 in cap die 110 is aligned with at least one resonator 10 on sensor die 100. Optical fiber 116 such as glass or plastic optical fiber with a fiber jacket protrudes and extends through fiber hole 114 of cap die 110 and is attached thereto. The free end of optical fiber 116 may be rounded or conjoined with an optical element (not shown) such as a lens to focus light onto resonator 10 and to collect reflected light therefrom. The depth of cap recess 118 and the wall thickness of cap die 110 are selected to reduce the effect of mismatched thermal expansion coefficients between cap die 110 and optical fiber 116 on the output from resonator 10 with changes in temperature. The radius at the periphery of deformable diaphragm 104 may be selected and controlled to reduce the stress concentration factor that generally accompanies sharp interior corners. For example, a diamond-coated drill bit or end mill with selectively profiled edges are available or can be manufactured, and then used to form deformable diaphragm 104 with a pre-selected edge radius and diaphragm thickness contours.

In one example, cap recess 118 of cap die 110 serves as pressure reference cavity 94 when sensor die 100 and cap die 110 are aligned and bonded for absolute pressure sensor configurations. In another example, an additional pressure port (not shown) through a side of cap die 110 allows for differential or gage pressure-sensor configurations. In another example, a beveled optical fiber 116 enters through a hole (not shown) in a side of cap die 110 to direct light onto and collect light from resonator 10.

Figure 8:
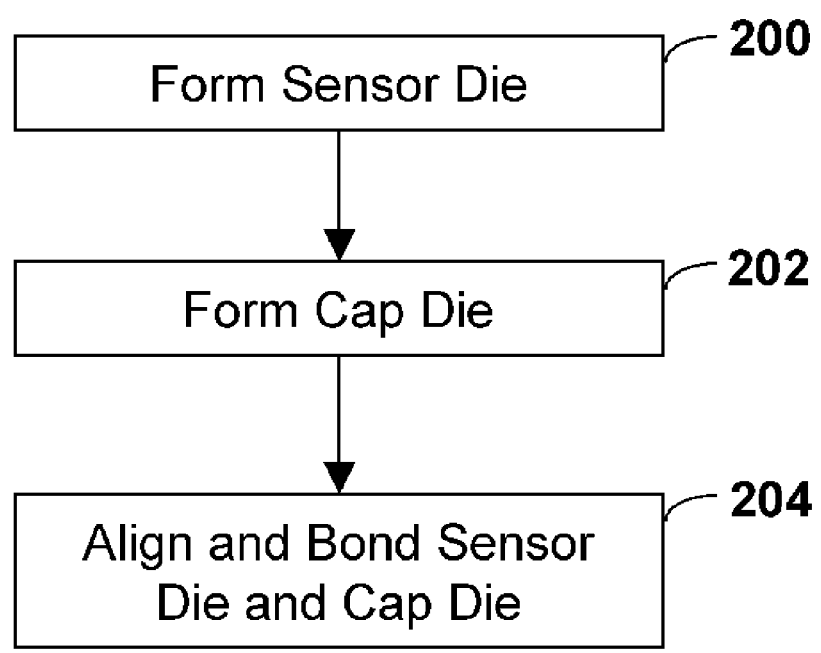
FIG. 8 is a flow diagram of a process for fabricating an optically coupled resonant pressure sensor, in accordance with one embodiment of the current invention.

FIG. 8 is a flow diagram of a process for fabricating an optically coupled resonant pressure sensor, in accordance with one embodiment of the present invention.

A sensor die is formed, as seen at block 200. A sensor die including one or more optically coupled resonators is formed on a semiconductor substrate such as a single-crystal silicon wafer or a silicon-on-insulator wafer. The sensor die may be formed using a cutting operation such as electric-discharge machining, ultrasonic drilling, core drilling, diamond drilling, ultrasonic milling, laser cutting, water jet cutting, dicing, sawing, machining, drilling, etching or cleaving. A deformable diaphragm may be formed in the sensor die depending on operating pressure range and overpressure requirements.

A cap die is formed, as seen at block 202. The cap die including a fiber hole is formed from a semiconductor substrate such as a single-crystal silicon wafer using, for example, a cutting operation such as electric-discharge machining, ultrasonic drilling, core drilling, diamond drilling, ultrasonic milling, laser cutting, water jet cutting, dicing, sawing, machining, drilling, etching or cleaving. The cap die may include a cap recess that forms a pressure reference cavity when the sensor die and the cap die are aligned and bonded.

The sensor die and the cap die are aligned and bonded, as seen at block 204. The sensor die and the cap die are aligned and bonded to form a resonant pressure sensor capsule. The fiber hole in the cap die is aligned with one or more resonators on the sensor die. The sensor die and the cap die may be bonded using a bonding technique such as silicon-to-silicon bonding, eutectic bonding, thermocompression bonding, solder bonding, polymeric bonding, thin-film anodic bonding, glass frit bonding, or wafer-to-wafer bonding. The sensor die and the cap die may be aligned and bonded at a wafer level, followed by cutting or other excising operation. Alternatively, the sensor die and the cap die may be aligned and bonded at a die level after individual sensor die and cap die have been formed.

FIG. 9 is a flow diagram of a process for fabricating an optically coupled resonant pressure sensor, in accordance with another embodiment of the present invention.

A sensor die is formed, as seen at block 210. A sensor die including one or more optically coupled resonators is formed on a semiconductor substrate such as a single-crystal silicon wafer or a silicon-on-insulator wafer. The sensor die may be formed using a cutting operation such as electric-discharge machining, ultrasonic drilling, core drilling, diamond drilling, ultrasonic milling, laser cutting, water jet cutting, dicing, sawing, machining, drilling, etching or cleaving. A deformable diaphragm may be formed in the sensor die.

A spacer die is formed, as seen at block 212. The spacer die including a spacer hole may be formed from a semiconductor substrate such as a single-crystal silicon wafer. Spacer die may be formed, for example, using a cutting operation such as electric-discharge machining, ultrasonic drilling, core drilling, diamond drilling, ultrasonic milling, laser cutting, water jet cutting, dicing, sawing, machining, drilling, etching, or cleaving.

A cap die is formed, as seen at block 214. The cap die including a fiber hole is formed from a semiconductor substrate such as a single-crystal silicon wafer using, for example, a cutting operation such as electric-discharge machining, ultrasonic drilling, core drilling, diamond drilling, ultrasonic milling, laser cutting, water jet cutting, dicing, sawing, machining, drilling, etching or cleaving. The cap die may include a cap recess that forms a pressure reference cavity when the sensor die and the cap die are aligned and bonded.

The sensor die and the cap die are aligned and bonded, as seen at block 216. The sensor die, the spacer die and the cap die are aligned and bonded to form a resonant pressure sensor capsule. In one example, the spacer die is positioned between the sensor die and the cap die prior to aligning and bonding the sensor die, the spacer die and the cap die. The fiber hole in the cap die is aligned with one or more resonators on the sensor die. The sensor die, spacer die and the cap die may be bonded using a bonding technique such as silicon-to-silicon bonding, eutectic bonding, thermocompression bonding, solder bonding, polymeric bonding, thin-film anodic bonding, glass frit bonding, or wafer-to-wafer bonding. In another example, the spacer die is positioned adjacent to the sensor die and bonded thereto, followed by the spacer die being positioned and bonded to the cap die. In another example, the spacer die is positioned and bonded to the cap die, and then positioned and bonded to the sensor die. The sensor die, spacer die and the cap die may be aligned and bonded in parts or as a whole at a wafer level or at a die level.

An optical fiber is inserted and attached, as seen at block 218. In one example, the optical fiber is inserted into the fiber hole of the cap die after aligning and bonding the sensor die, spacer die and the cap die. The optical fiber is then attached to the cap die. In another example, the optical fiber is inserted into the fiber hole of the cap die prior to aligning and bonding the sensor die, spacer die and the cap die. The optical fiber is attached to the cap die prior to or after bonding the sensor die, spacer die and cap die.

The substrates, resonators, devices and processes described above can be adapted to form electrically coupled resonant devices, foregoing the need for optical connectivity. On-chip integrated circuitry or bondwire connections to external circuitry can be provided for generating and processing the output from one or more resonators.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are embraced herein.

What is claimed is:

1. An optically coupled resonant pressure sensor comprising:
   a sensor die including a pressure-sensitive deformable diaphragm and at least one optically coupled resonator; and
   a cap die including a fiber hole and a cap recess;
   wherein the sensor die and the cap die are bonded to form a resonant pressure sensor capsule, and wherein the fiber hole in the cap die is aligned with at least one resonator on the sensor die.

2. The pressure sensor of claim 1, wherein the sensor die comprises a substrate of single-crystal silicon, a silicon-on-insulator wafer, a double-SOI wafer, polysilicon, silicon carbide, diamond, sapphire, quartz, Pyrex®, glass, metal, ceramic, plastic, an insulative material, a semiconductor material, a conductive material, or a combination thereof.

3. The pressure sensor of claim 1, wherein the cap die comprises a substrate of single-crystal silicon, polysilicon, silicon carbide, diamond, sapphire, quartz, Pyrex®, glass, metal, ceramic, plastic, an insulative material, a semiconductor material, a conductive material, or a combination thereof.

4. The pressure sensor of claim 1, wherein the cap die with the cap recess forms a pressure reference cavity when the sensor die and the cap die are aligned and bonded.

5. The pressure sensor of claim 1, wherein the sensor die and the cap die are aligned and bonded together at one of a wafer level or a die level.

6. The pressure sensor of claim 1, wherein the resonant pressure sensor capsule has a circular, square or rectangular geometry.

7. The pressure sensor of claim 1, wherein a pressure reference cavity between the sensor die and the cap die retains a vacuum or a prescribed pressure within the pressure reference cavity to allow absolute pressure measurements.

8. The pressure sensor of claim 1, wherein a pressure reference cavity between the sensor die and the cap die retains a vacuum to allow the optically coupled resonator to operate without a resonator shell around the resonator.

9. The pressure sensor of claim 1, wherein a photodiode for exciting the optically coupled resonator into resonance is located in a substrate underneath the resonator.

10. The pressure sensor of claim 1, wherein a photodiode for exciting the optically coupled resonator into resonance is located in a substrate offset laterally from the resonator.

11. The pressure sensor of claim 1, wherein a photodiode for exciting the optically coupled resonator into resonance is positioned in a portion of the upper surface of the resonator, in a sidewall of the resonator, in a sidewall of a structural layer adjacent to the resonator, or in a resonator shell around the resonator.

12. The pressure sensor of claim 1, wherein the resonant pressure sensor capsule includes a pressure port through the side or top of the resonant pressure sensor capsule to allow differential or gage pressure measurements.

13. The pressure sensor of claim 1, wherein the cap die is extended for additional stress isolation.

14. The pressure sensor of claim 1 further comprising:
a spacer die including a spacer hole positioned between the sensor die and the cap die.

15. The pressure sensor of claim 14, wherein the spacer die comprises single-crystal silicon, polysilicon, silicon carbide, diamond, sapphire, quartz, Pyrex®, glass, metal, ceramic, plastic, an insulative material, a semiconductor material, a conductive material, or a combination thereof.

16. The pressure sensor of claim 14, wherein the spacer die is positioned between the sensor die and the cap die and is bonded at one of a wafer level or a die level.

17. The pressure sensor of claim 1 further comprising:
an optical fiber inserted into the fiber hole and attached to the cap die.

18. The pressure sensor of claim 17, wherein the optical fiber comprises one of a plastic fiber or a glass fiber.

19. The pressure sensor of claim 17, wherein the optical fiber comprises one of a single-mode fiber or a multi-mode fiber.

20. The pressure sensor of claim 17, wherein the optical fiber is adapted to focus light onto the resonator.

21. The pressure sensor of claim 1 further comprising:
an optical element to guide incident light onto the resonator.

22. An optically coupled resonant pressure sensor comprising:
a sensor die including a pressure-sensitive deformable diaphragm and at least one optically coupled resonator; and
a transparent cap die including a cap recess;
wherein the sensor die and the cap die are bonded to form a resonant pressure sensor capsule.

23. The pressure sensor of claim 22 further comprising:
an optical fiber attached to the cap die.

24. An optically coupled resonant pressure sensor comprising:
a sensor die including a pressure-sensitive deformable diaphragm and at least one optically coupled resonator;
a transparent cap die including a cap recess; and
a spacer including a spacer hole positioned between the sensor die and the cap die;
wherein the sensor die, the cap die, and the spacer die are bonded to form a resonant pressure sensor capsule.

25. The pressure sensor of claim 24 further comprising:
an optical fiber attached to the cap die.

* * * * *